United States Patent [19]

Olson

[11] 4,143,671
[45] Mar. 13, 1979

[54] DUCTING FIRE PROTECTION
[75] Inventor: Rodney I. Olson, Los Angeles, Calif.
[73] Assignee: Fiber-Dyne, Inc., Sun Valley, Calif.
[21] Appl. No.: 740,778
[22] Filed: Nov. 11, 1976
[51] Int. Cl.² .......................................... F16K 17/38
[52] U.S. Cl. ........................................ 137/72; 251/4; 264/230; 264/261; 285/187; 285/423
[58] Field of Search ............... 285/423, 174, DIG. 16, 285/235, 236, 238, 351, 187, 417; 138/89; 137/67, 72–77, 457

[56] References Cited
U.S. PATENT DOCUMENTS

| | | | |
|---|---|---|---|
| 1,699,244 | 1/1929 | Lewis | 169/57 |
| 2,735,699 | 2/1956 | Chadbourne | 285/423 X |
| 2,843,153 | 7/1958 | Young | 285/423 X |
| 3,459,445 | 8/1969 | Parkhill | 285/423 X |
| 3,496,022 | 2/1970 | Lit | 137/72 X |
| 3,504,615 | 4/1970 | Kurz | 98/1 |
| 3,516,693 | 6/1970 | Glover | 285/235 |
| 3,570,384 | 3/1971 | McLeod | 98/1 |
| 3,592,207 | 7/1971 | Borello | 137/1 |
| 3,720,153 | 3/1973 | Jardinier et al. | 98/86 |
| 3,726,050 | 4/1973 | Wise et al. | 137/75 |
| 3,756,137 | 9/1973 | Scharres | 98/1 |
| 3,835,875 | 9/1974 | Morse | 137/75 |
| 3,921,657 | 11/1975 | Bergmark et al. | 137/75 |

FOREIGN PATENT DOCUMENTS

| | | | |
|---|---|---|---|
| 229903 | 7/1959 | Australia | 285/235 |
| 502094 | 3/1939 | United Kingdom | 251/7 |
| 778976 | 7/1957 | United Kingdom | 285/235 |
| 860906 | 2/1961 | United Kingdom | 285/238 |
| 1175182 | 12/1969 | United Kingdom | 285/235 |

Primary Examiner—Martin P. Schwadron
Assistant Examiner—Richard Gerard
Attorney, Agent, or Firm—Harris, Kern, Wallen & Tinsley

[57] ABSTRACT

A length of fiberglass duct with a thermoplastic sleeve positioned within the duct as a liner, with the sleeve fixed to the duct at the downstream end of the sleeve. Flames or high temperature fluids moving through the duct soften the thermoplastic sleeve and causes the sleeve to collapse blocking further movement through the duct. In an alternative embodiment, the sleeve is used as a splice between two pieces of duct with the heat in the duct causing the softening and collapse of the sleeve.

2 Claims, 6 Drawing Figures

U.S. Patent  Mar. 13, 1979  4,143,671
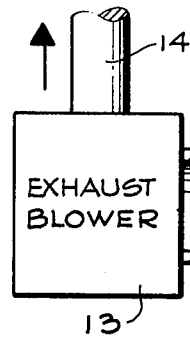
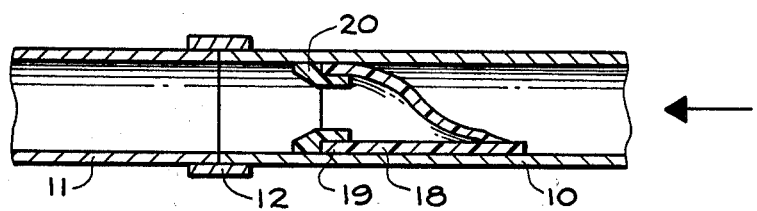
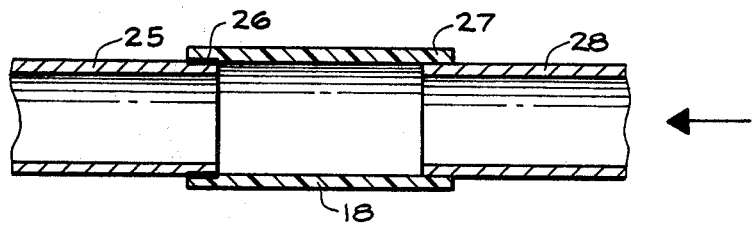
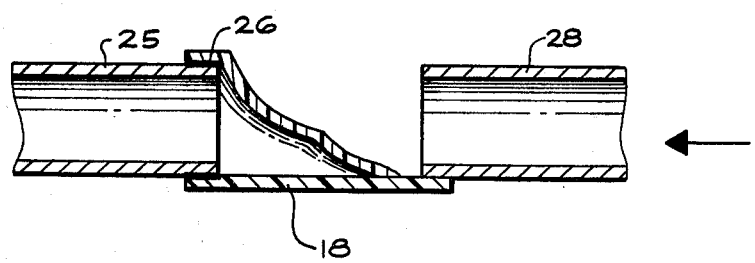
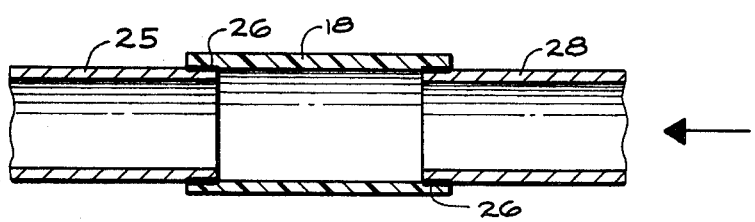
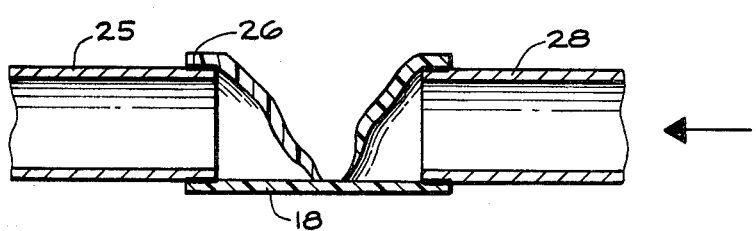

DUCTING FIRE PROTECTION

BACKGROUND OF THE INVENTION

This invention relates to ducting and in particular to a fire protection system particularly suited for ducts made of fiberglass and other high temperature corrosion resistant plastic.

Ducting is widely used for exhausting gases and vapors in many industrial and commercial installations. The ducting passes through walls and other fire stops and presents a problem with fire control since flames and high temperature fluids can move through ducting causing undesirable spread of fire, smoke, fumes and the like.

A substantial amount of ducting in use is formed of metal and a wide variety of fire protection devices are available for metal ducting. Typically a temperature detector of some nature is positioned in the pipe and when the temperature in the pipe rises to a predetermined value, a damper is closed, blocking movement of flame through the pipe. A counter weighted damper may be held in the up or open position by a fusible link which when melted, permits movement of the damper.

However many ducting installations are required to handle highly corrosive vapors and the metal duct is not satisfactory. Fiberglass duct is extensively used today to meet the requirement of high temperature corrosion resistance and the damper type fire protection systems are not suitable for use therewith. One approach to the problem has been to install sprinkler heads within the fiberglass ducts, with the sprinklers controlled by temperature sensors. This is an expensive type of installation and has not been entirely satisfactory. As used herein, fiberglass is intended to include those plastic materials having high temperature corrosion resistance and used in the manufacture of ducting.

It is an object of the present invention to provide a new and improved fire protection system for use with high temperature corrosion resistant ducts, which system does not utilize any metal components so that the corrosive fluid handling capabilities of the duct is not adversely affected. A further object is to provide such a fire protection system which is simple, easy to install, and relatively inexpensive.

SUMMARY OF THE INVENTION

In one embodiment of the invention, a thermoplastic sleeve is disposed within a fiberglass duct as a liner, with the sleeve fixed to the duct at the downstream end of the sleeve. When flames or high temperature fluids pass through the duct, the sleeve is softened and collapses, with the force of gravity and the force of the moving fluid aiding the collapse. The collapsed sleeve blocks flow in the duct and prevents movement of the flame along the duct. Various thermoplastic materials can be used, depending upon the temperature at which the system is to become operable.

In an alternative embodiment, the sleeve is used as a splice between two lengths of duct. In one variation, the sleeve is fixed at one end and slides on the duct at the other end. When the sleeve softens it slides off the free end, collapsing and blocking flow and also permitting entry of outside air for cooling and extinguishing purposes. In another variation, the sleeve is fixed at both ends, with the sleeve softening and rupturing when heated to block flow and admit outside air. This latter variation is particularly suited for installations which may have flow in both directions.

BRIEF DESCRIPTION OF THE DRAWING

FIG. 1 is a view partly in section illustrating a fire protection system incorporating the presently preferred embodiment of the invention;

FIG. 2 is a view of a portion of FIG. 1 showing the sleeve in the collapsed position;

FIGS. 3 and 4 are views similar to FIGS. 1 and 2, respectively, showing an alternative embodiment of the invention; and FIGS. 5 and 6 are views similar to FIGS. 3 and 4, respectively, showing another alternative embodiment of the invention.

DESCRIPTION OF THE PREFERRED EMBODIMENTS

FIG. 1 illustrates a piece of fiberglass duct 10 joined to another piece of fiberglass duct 11 by a conventional joint 12. The duct 11 provides an input to a blower 13 with an outlet duct 14. This is a typical installation of fiberglass ducting for moving corrosive vapors.

A thermoplastic sleeve 18 is positioned within the duct 10, snugly fitting the inner wall of the duct as a liner. The downstream end 19 of the sleeve is fixed to the duct 10, typically by a length of fiberglass 20 impregnated with an appropriate resin for bonding to the material of the duct and the material of the sleeve.

In a typical installation, the fiberglass duct may be in the order of one foot to three feet in diameter and the thermoplastic sleeve may be in the order of four feet to eight feet in length. Of course the invention is not limited to these particular dimensions and smaller or larger dimensions may be utilized. The sleeve is formed of a thermoplastic which remains stiff at the normal operating temperature, while softening but not melting or vaporizing at the higher temperature produced by flame. A presently preferred material is rigid polyvinyl chloride, with a 1/16 inch wall thickness for smaller diameters and a ⅛ inch wall thickness for larger diameters, such as 1/16 inch for a one foot diameter sleeve and ⅛ inch for a two foot diameter sleeve and larger. Other thermoplastic materials which may be used for the sleeve are acrylonitrilebutadiene-styrene. rubber modified styrene, polyvinyl dichloride, polypropylene, polyethylene, cellulose acetate butyrate, polyacepal, and teflon.

In operation, the vapor or gas or other fluid is moved through the duct from right to left as viewed in FIG. 1. If for any reason there is a flame in the duct or a fluid with very high temperature, the plastic sleeve will soften and collapse under the influence of gravity and the force produced by the moving fluid, to the position shown in FIG. 2. The collapsed sleeve serves to block flow through the duct, thereby preventing the exhaust blower from sucking the flame through the ducting system. It will be understood that the temperature at which the sleeve softens and collapses can be varied by utilizing various materials for the thermoplastic sleeve.

An alternative embodiment is illustrated in FIGS. 3 and 4, with the sleeve 18 affixed at one end to a fiberglass duct 25, typcially by a resin joint at 26. The other end 27 of the sleeve slides over another length of duct 28.

The operation is similar to that discussed with the embodiment of FIGS. 1 and 2. The heat in the duct will soften the thermoplastic sleeve causing it to sag and slide off the duct 28, after which the sleeve will collapse and block flow into the duct 25. Also, the opening will permit an inflow of ambient air for cooling the interior of the ducting.

Another alternative embodiment is shown in FIGS. 5 and 6, with the sleeve 18 fixed at one end of the duct 25 and fixed at the other end to the duct 28. In this configuration, the thermoplastic sleeve when heated will sag and rupture as shown in FIG. 6. The ruptured sleeve will tend to block flow through the ducting. This latter embodiment is particularly suited for installations where there may be flow in one direction at one time and flow in the opposite direction at another time.

I claim:

1. A fire protection system for ducting comprising:
   a length of fiberglass duct having a flow path therethrough;
   a thermoplastic sleeve disposed coaxial with said duct and affixed at one end to said duct; and
   a second length of fiberglass duct disposed coaxial with said one duct and sleeve, with the other end of said sleeve positioned over the adjacent end of said second duct and free to move axially relative to said second duct, and with said second duct spaced from said first duct by said sleeve a distance greater than the diameter of said sleeve;
   said sleeve being of a material characterized by having a softening temperature substantially lower than the softening temperature of said fiberglass ducts to effect collapsing of said sleeve into the flow path of said ducts when said sleeve is heated to its softening temperature by flame or fluid flow in said ducts.

2. A fire protection system for ducting comprising:
   a first length of fiberglass duct having a flow path therethrough;
   a single uniform diameter thermoplastic sleeve disposed coaxial with said first duct and affixed at one end to said first duct; and
   a second length of fiberglass duct disposed coaxial with said first duct and sleeve, with the other end of said sleeve affixed to said second duct, with said first and second ducts supporting said sleeve therebetween, and with said second duct spaced from said first duct by said sleeve a distance greater than the diameter of said sleeve;
   said sleeve being of a material characterized by having a softening temperature substantially lower than the softening temperature of said fiberglass ducts to automatically effect permanent collapse of said sleeve into the flow path between said ducts and rupturing of said sleeve to form valving portions when said sleeve is heated to its softening temperature by flame or fluid flow in said ducts, with said ruptured sleeve portions being of sufficient length to block flow through each duct.

* * * * *